UNITED STATES PATENT OFFICE.

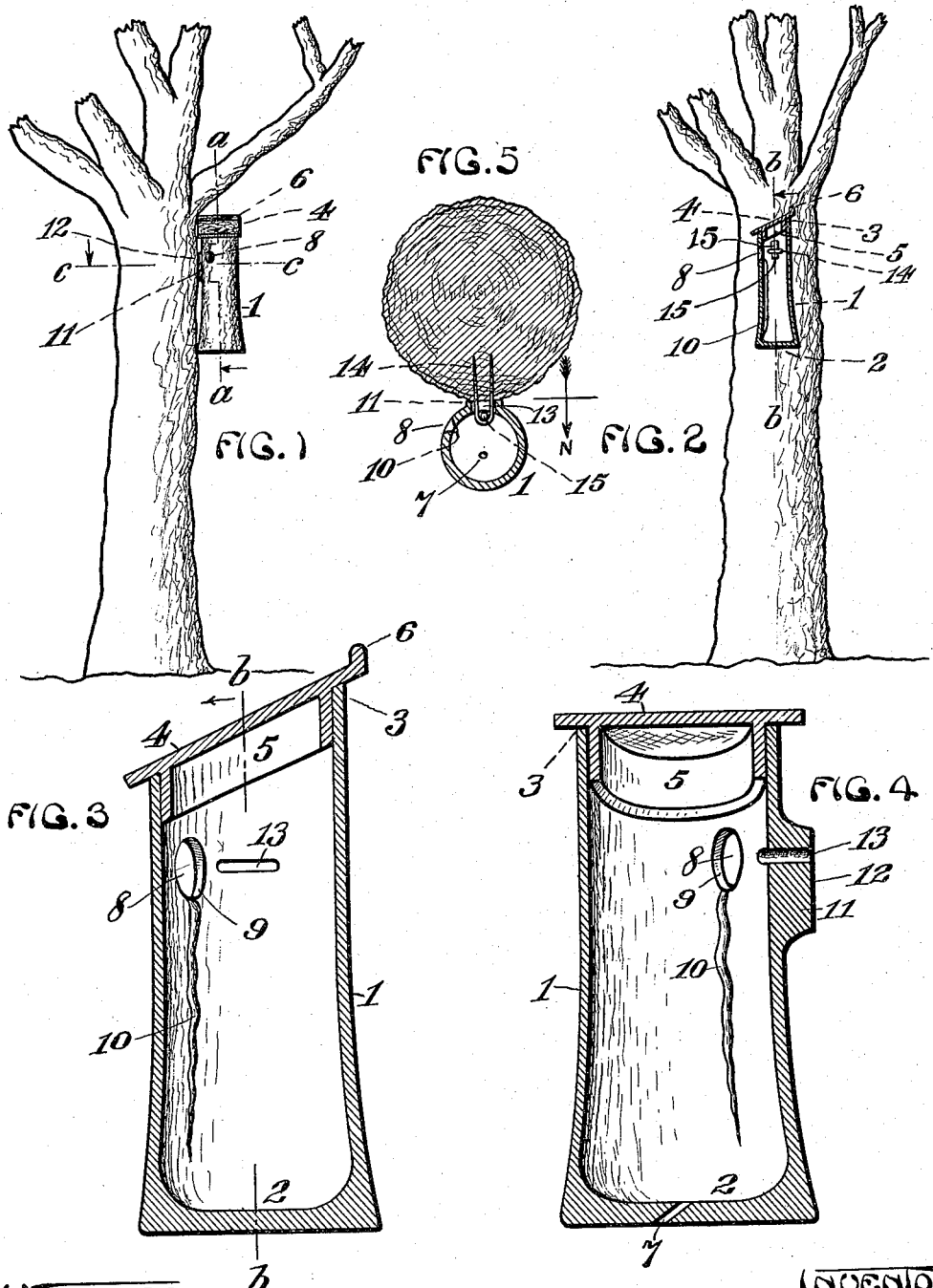

HARRIS M. BENEDICT, OF CINCINNATI, OHIO.

BIRD-BOX.

1,158,968.  Specification of Letters Patent.  Patented Nov. 2, 1915.

Application filed March 30, 1912. Serial No. 687,495.

*To all whom it may concern:*

Be it known that I, HARRIS M. BENEDICT, a citizen of the United States of America, and a resident of Cincinnati, in the county of Hamilton and State of Ohio, have invented a certain new and useful Improvement in Bird-Boxes, of which the following is a specification.

This invention relates to bird-boxes for use on trees or other places occupied by birds in making nests or homes for themselves and their young, and its structure will be fully detailed in the following description of the accompanying drawings.

The advantages will be referred to incidentally in the description of the various parts of the device that is made hereinafter and the invention consists in certain novel features of construction and arrangement of parts that will, also, be hereinafter referred to and particularly pointed out in the claims.

In the accompanying sheet of drawings, Figure 1 is an elevation showing the device in place on the trunk of a tree; Fig. 2, a view taken at right-angles to Fig. 1, but showing the device in vertical central section, taken on the dotted-line $a$, $a$ of Fig. 1; Fig. 3, a vertical section of the device, but on a line a little forward to that $a$, $a$, of Fig. 1, and escaping the inlet-and-exit orifice in such section, on a larger scale and omitting the tree; Fig. 4, a view similar to Fig. 3 but taken at right-angles to the latter and on the dotted-line $b$, $b$ of both Figs. 2 and 3; and Fig. 5, a horizontal section taken on the dotted-line $c$, $c$ of Fig. 1, to more clearly show the manner of fastening the device in place.

My invention herein is designed to provide a bird box or nest made of fire-clay or pottery that can be readily shaped while in the plastic form and its surface made to simulate the bark of a tree, such material being particularly advantageous for the reason that it is cleanly, sanitary, not affected by the elements and proof against warping or decaying and, also, its rough, bark finish adds to its attractiveness while not making it too conspicuous as a bird home when fastened in place to the bark surface of a tree; to provide a cylindrical vessel or receptacle having a removable inclined lid or cover for ready access to the interior and a side-opening just below said lid or cover for the entrance and exit of the birds and, also, having a projecting, thickened portion or boss adjacent said side-opening for use in properly setting the device in place against the bark surface of the tree, a horizontal slot being provided in said projecting portion or boss for engaging a staple that is first driven into the tree and projects outwardly sufficient to receive a peg or wedge-shape pin on the inner face of the receptacle to securely hold or attach the device in position; to still further provide said bird home with a lid that projects laterally from the upper edge of the receptacle when in place, to form a projecting roof for said receptacle and thereby facilitate drainage without permitting any leakage into the receptacle, a deep flange being also provided on the bottom of the lid to prevent the latter slipping from place or being blown or dislodged therefrom while, at the same time, permitting said lid to be readily removed when desired to get at the interior of the nest for such purposes as photographing the young, placing material or food in the nest, or removing anything from the nest, all as the case may be; and to further provide within the aforesaid receptacle a climbing strip that leads from the bottom to the side-opening near the top, to aid young birds or injured ones in reaching said side-opening.

1 indicates a cylindrical vessel having a bottom 2 and a sloping open top 3.

4 indicates a removable lid or cover having a pendent flange 5 of suitable diameter to removably fit within the upper opening or top of the vessel 1, as best seen in Fig. 3. The flange 5 is of considerable depth to prevent the sloping lid or cover sliding from place or being easily blown or accidentally displaced from the receptacle 1. This lid being a sloping one forms a suitable slanting roof for the device and it projects along its four edges beyond the upper edge or mouth of said receptacle 1 at a suitable distance to protect the interior from leakage and to properly drain or shed anything falling thereon. The upper edge or tip of the lid is provided with a projection 6 that forms a desirable perch for the birds to light on.

7 indicates a slanting drain and vent hole in the bottom of the receptacle 1, the degree of slant thereof being sufficient to prevent direct light being seen from within at said bottom of the device. Such slant will also prevent a direct draft or current of air passing into the receptacle from below.

8 indicates a hole or opening located near the upper edge or top of the receptacle 1, slightly below the lower edge of the pendent flange of the lid, as best seen in Fig. 4. This hole or opening forms the orifice through which the birds enter and leave said receptacle. It is made beveled outwardly, as shown at 9 in Fig. 3, so as to readily shed water beating against it and, also, to resemble, as near as possible, the typical woodpecker opening common in trees used by that particular class of birds in nesting.

10 indicates an irregular rib or roll formed or attached within the receptacle 1 and disposed vertically from the orifice 8 down to a level that is slightly above the rounded or concave bottom 2, as best seen in Figs. 3 and 4. This rib is adapted to form a suitable means for the young birds or injured ones to use in climbing to the said orifice 8.

11 indicates a protuberant or thickened portion of the vertical wall of the receptacle 1, located near the top thereof but below the level of the pendent flange of the lid, as best seen in Fig. 4. This protuberant portion forms a boss on the outer tapered side of the receptacle and has a flat vertical face 12 that contacts with the bark surface of the tree or with the face of the object on which the device is hung, or to which it is attached in use, whereby a firm fastening can be readily effected and rocking or oscillation avoided.

13 indicates a horizontal slot pierced in the thickened portion or boss 11 near the extreme upper edge thereof so as to be located above the center of gravity of the device.

14 indicates a staple driven into the tree or other supporting object so that its pointed arms or prongs lie in a horizontal parallel plane, as best seen in Fig. 5. In attaching the bird-box in place the projecting bowed portion of the staple is engaged by the horizontal slot 13 and a peg or wedge 15 is inserted in the now extended eye of said staple to form a means of securely fastening the device in place. The thickened portion or boss 11 forms a reinforcing wall around said attaching slot, thereby reducing the chances of fracture to the receptacle at that point and, also, suitably spacing the device from the bark of the tree along the greater part of its face and enabling the projecting portion of the lid to suitably overlap on the side toward the tree. The flat outer face of the boss is adapted to hold the bird home in a vertical line without any undue side strain or the like on the staple.

The wedge and staple form of attachment is a very convenient one, as well as inexpensive, practically needing no tools in either attaching or detaching the device wherever used.

In placing the device in position for use I prefer to have it mounted on the north side of the tree, with its inlet and exit orifice or hole facing approximately south-east (the direction preferred by birds) and closely as possible to the tree for shelter and privacy, as best seen in Fig. 5. In thus mounting the device on the north side of the tree it is protected from direct sunlight and consequent heat in the summer.

I claim:—

1. A bird-box comprising a cylindrical vessel having a side inlet-and-exit orifice, a removable lid having a pendent circular flange adapted to freely engage within the open-mouthed top of said vessel above said side opening and, also having its edges overlapping and extending beyond the edge of said open-mouthed top, and a thickened flat-faced boss-portion adjacent said side opening and having a horizontal slot pierced therein, orificed means driven into the tree for engagement with said slot, and a vertical pin adapted to engage said orificed means to detachably connect the device in using position.

2. A bird-box comprising a cylindrical vessel having a horizontal bottom that has an inclined vent-passage pierced therein and a side inlet-and-exit orifice adjacent its top, and a removable lid having a transverse raised edge along its highest part and adapted to form a top perch.

3. A bird-box comprising a cylindrical vessel having a horizontal bottom and a side inlet-and-exit orifice adjacent its top, a removable lid adapted to fit the top of the vessel, and a vertical tortuous climbing-rib on the inner face of the vessel and extending downwardly from the lower edge of the said side orifice to said bottom of the vessel.

HARRIS M. BENEDICT.

Witnesses:
JOHN ELIAS JONES,
LORETTA LUCK.

Copies of this patent may be obtained for five cents each, by addressing the "Commissioner of Patents, Washington, D. C."